US 6,736,175 B2

(12) United States Patent
Carra et al.

(10) Patent No.: US 6,736,175 B2
(45) Date of Patent: May 18, 2004

(54) MOTOR VEHICLE TIRE, PARTICULARLY FOR LORRIES AND THE LIKE

(75) Inventors: Alberto Carra, Milan (IT); Luigi Campana, Milan (IT)

(73) Assignee: Pirelli Pneumatici S.P.A., Milan (IT)

( * ) Notice: Subject to any disclaimer, the term of this patent is extended or adjusted under 35 U.S.C. 154(b) by 233 days.

(21) Appl. No.: 09/843,940

(22) Filed: Apr. 30, 2001

(65) Prior Publication Data

US 2002/0124922 A1 Sep. 12, 2002

Related U.S. Application Data

(63) Continuation of application No. PCT/EP99/08029, filed on Oct. 22, 1999.
(60) Provisional application No. 60/114,064, filed on Dec. 28, 1998.

(30) Foreign Application Priority Data

Oct. 30, 1998 (EP) .............................. 98830663

(51) Int. Cl.$^7$ .................. B60C 11/11; B60C 11/13; B60C 107/00
(52) U.S. Cl. ............... 152/209.18; 152/209.19; 152/209.21; 152/209.22; 152/209.27; 152/902; 152/DIG. 1
(58) Field of Search ................. 152/209.2, 209.18, 152/209.19, 209.22, 209.21, 209.24, 209.25, 209.27, 902, DIG. 1

(56) References Cited

U.S. PATENT DOCUMENTS

| 2,432,847 | A |   | 12/1947 | Woods |
| 4,840,211 | A | * | 6/1989 | Makino |
| 4,955,415 | A |   | 9/1990 | Takeuchi et al. |
| 5,095,963 | A | * | 3/1992 | Maitre |
| 5,361,815 | A | * | 11/1994 | Loser et al. |
| 5,361,816 | A | * | 11/1994 | Hitzky |
| 6,079,464 | A | * | 6/2000 | Hatakenaka et al. |
| 6,527,024 | B1 | * | 3/2003 | Ashmore |

FOREIGN PATENT DOCUMENTS

| EP | 0 348 335 A2 | 12/1989 |
| EP | 0 598 300 A1 | 5/1994 |
| EP | 0 773 116 A1 | 5/1997 |
| EP | 841198 | * 5/1998 |
| GB | 2 124 163 A | 2/1984 |
| IT | 01245773 | 4/1991 |
| JP | 4-87807 | * 3/1992 |

OTHER PUBLICATIONS

Hideki, Y., "Pneumatic Radial Tire", Patent Abstracts of Japan of JP No. 06227213, Jun. 17, 1997.

* cited by examiner

Primary Examiner—Steven D. Maki
(74) Attorney, Agent, or Firm—Finnegan, Henderson, Farabow, Garrett, Dunner, L.L.P.

(57) ABSTRACT

A vehicle wheel tyre includes a carcass structure, a belt structure, and a tread. The tread includes four circumferential grooves and a plurality of transverse grooves that define at least five circumferential rows of blocks, each block approximating a polygon. The longitudinal sides of the blocks are inclined in the same direction at a predetermined angle to the equatorial plane of the tyre. The blocks of each row are circumferentially staggered relative to the blocks of the next row. The blocks of the central row include stiffening means. Profiles of the front sides of the blocks of the central row are the same as the profiles of the rear of the blocks of the central row rotated through 180°. The blocks of the shoulder rows are elastically linked to the blocks of the intermediate rows.

69 Claims, 5 Drawing Sheets

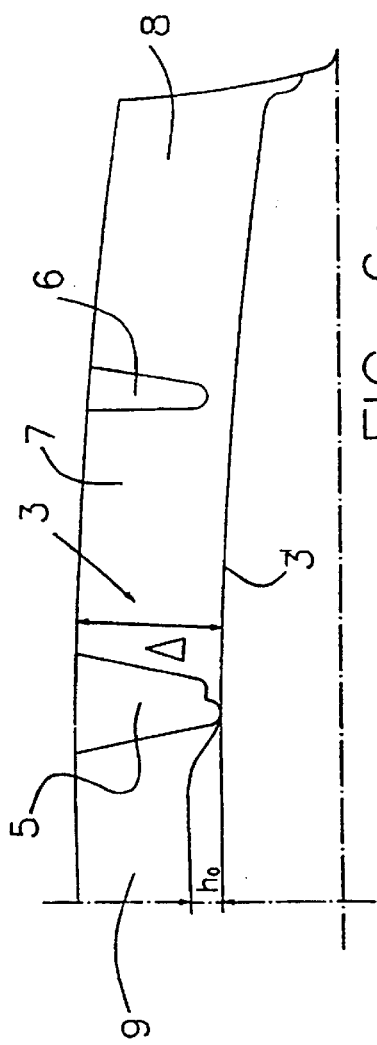
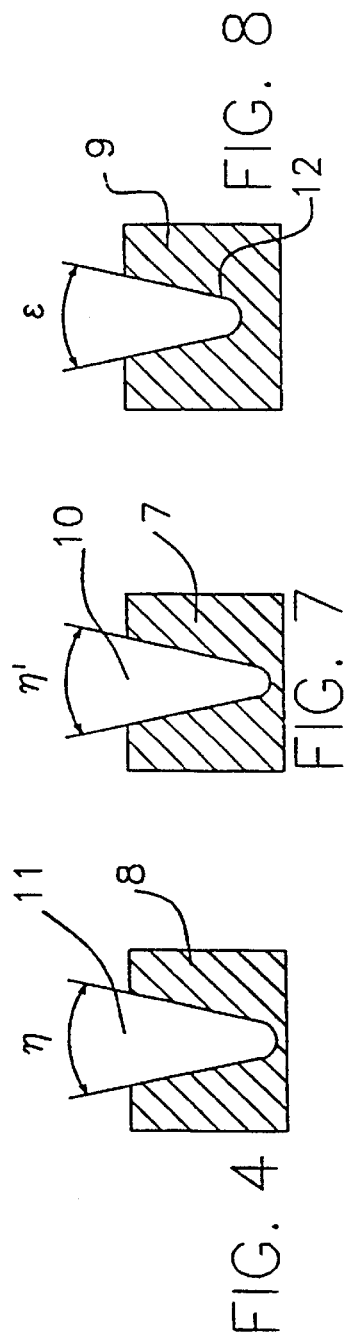

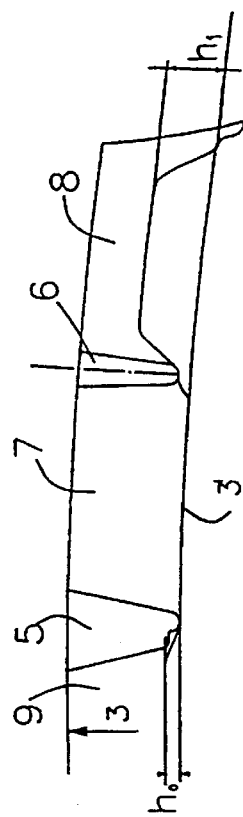
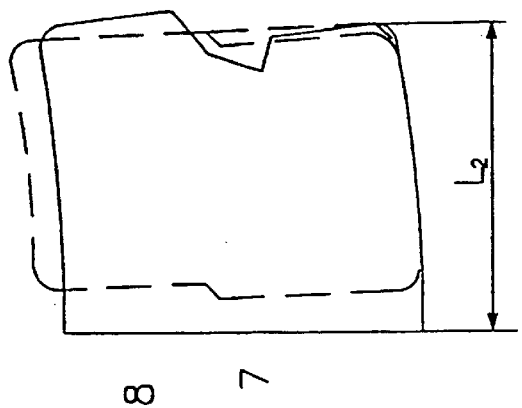
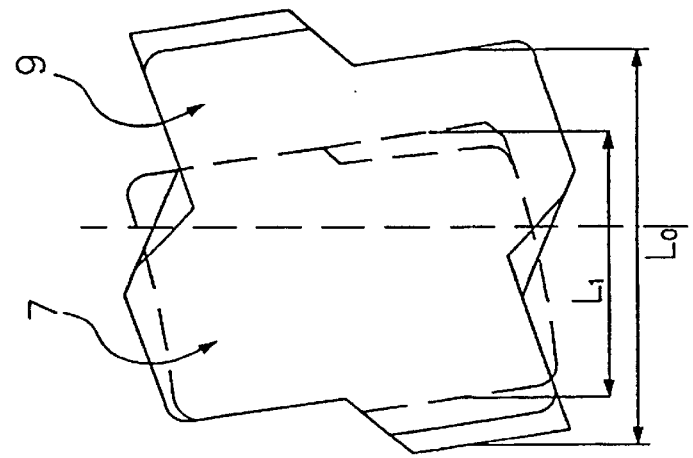
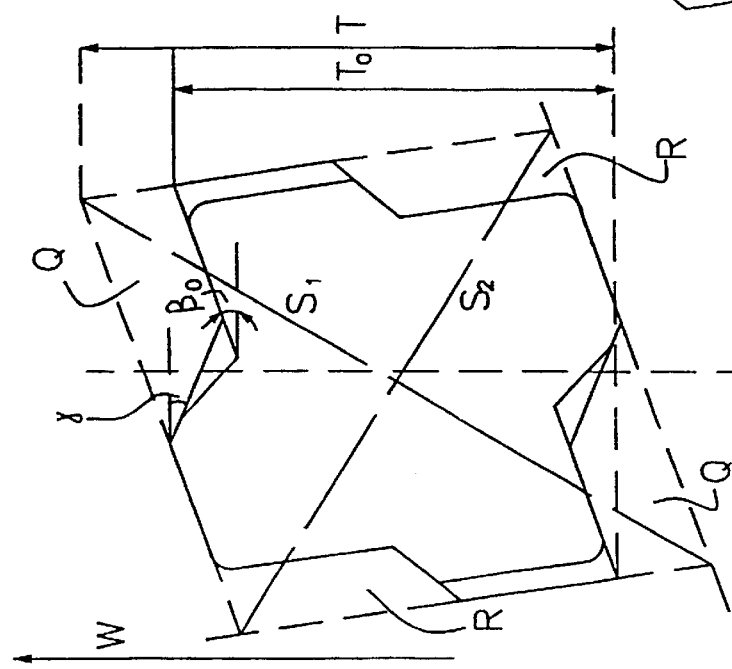

MOTOR VEHICLE TIRE, PARTICULARLY FOR LORRIES AND THE LIKE

CROSS-REFERENCES RELATED

This application is a continuation of International Patent Application No. PCT/EP99/08029, filed Oct. 22, 1999, in the European Patent Office; additionally, Applicants claim the right of priority under 35 U.S.C. §119(a)–(d) based on patent application No. 98830663.5, filed Oct. 30, 1998, in the European Patent Office; further, Applicants claim the benefit under 35 U.S.C. §119(e) based on prior-filed, copending provisional application No. 60/114,064, filed Dec. 28, 1998, in the U.S. Patent and Trademark Office; the contents of all of which are relied upon and incorporated herein by reference.

The present invention relates to motor vehicle tyres, particularly for lorries and the like, intended for heavy-haulage.

The invention is particularly concerned with tyres intended for use on the live axle of trucks or articulated lorries on mid-length journeys, i.e. on routes which, as is well known, impose severer demands and generate more wear than long journeys, which generally take place on motorways.

DESCRIPTION OF THE RELATED ART

Tyres designed to be mounted on live axles usually have a tread of elastomeric material containing a relief pattern comprising circumferential grooves intersected by transverse grooves so as to form a plurality of blocks, hence the name "block" tyres, to distinguish them from "ribbed" tyres formed from continuous circumferential ribs having poorer grip properties.

In the remainder of the description and in the claims that follow, the expression "elastomeric material" is used to indicate the rubber compound in its entirety, that is the total mixture composed of one or more base polymers suitably amalgamated with reinforcing fillers and other product additives and process additives such as accelerators, retardants, anti-ageing agents, plasticizers, cross-linking agents and so forth.

Furthermore, the term "tread" is used to indicate the strip of elastomeric material provided with a sheet of a different compound laid on the radially innermost surface of the said strip to promote the adhesion of the tread when cold to the underlying elements of the carcass, in particular the belt layers.

Tyres for live axles have to satisfy multiple requirements: in particular they must provide good grip on both dry surfaces and wet and/or snow-covered surfaces.

In addition, both the market and many national legislations are increasingly demanding quiet-running tyres, whereas the use of "block" tyres generally produces more noise than "ribbed" tyres.

The tread must also wear evenly and offer high mileage.

On top of this, treads are required to have a pattern capable of efficiently expelling stones and small fragments that become trapped in the grooves of the tread, since if such stones or fragments were to remain in the tread they could perforate the tread as the tyre wears down and so damage the underlying belt structure.

The prior art already includes tyres capable of confronting these problems and offering a solution to them.

For example, Italian Patent 1,245,773 by the Applicant discloses a tread comprising at least four rows of blocks defined by at least three circumferential grooves of different widths, the axially innermost groove being wider and the two lateral grooves on either side of the equatorial plane of the tyre being narrower, and by a plurality of oblique transverse grooves connecting pairs of circumferentially adjacent grooves.

In this solution the narrow groove that separates the two lateral rows of blocks on each half of the tyre is characterized by the fact that its width is no greater than 2.5 mm and its depth not greater than that of the confluent transverse grooves while the blocks of the two lateral rows are circumferentially staggered relative to each other so that every block of each row is next to two consecutive blocks of the adjacent row.

This patent describes other solutions comprising, for example, two additional axially internal circumferential grooves defining a pair of circumferential ribs, in the walls of which there are oblique transverse grooves extending as far as the equatorial plane, so that the ribs have the appearance of two adjacent rows of blocks.

The blocks of all rows have an ordered configuration, the longitudinal sides of the blocks of any one row lying along two lines parallel to the equatorial plane.

In another solution the two rows of blocks of the two central ribs can be joined together to form a single row straddling the equatorial plane and in another solution the blocks of the central row may be of roughly hexagonal shapes.

Also known is a tyre comprising a "block"-type tread composed of four, that is two lateral and two central, circumferential grooves of equal width, and a plurality of transverse grooves that together define five rows of blocks, that is two axially external shoulder rows, two axially internal intermediate rows and a central row of blocks passing through the equatorial plane of the tyre.

The blocks of the central row and of the intermediate rows are all of identical "Z" shapes defined by two longitudinal sides and two transverse end sides, while the shoulder blocks are defined by two longitudinal sides and two transverse end sides, one at the front and one at the rear, both in the form of arrows and complementary to each other.

The longitudinal sides of the blocks of all rows are parallel with each other and inclined to the equatorial plane while the transverse end sides of the blocks of the central and intermediate rows are parallel with each other and slightly inclined to a plane perpendicular to the equatorial plane.

The blocks of the adjacent rows are also circumferentially offset relative to each other.

SUMMARY OF THE INVENTION

The Applicant was convinced that the performance of tyres of the prior art with "block"-type treads could be improved, particularly as regards protection against the penetration of stones towards the belt in the central zone of the tread, which is usually at greater risk, without this improvement triggering negative changes to other characteristics such as resistance to stone penetration in the lateral zones of the tread, grip, wear resistance and quiet running, but instead if possible introducing further improvements.

It was thought that it would be possible to achieve this result by employing a "block"-type tread comprising a widening of the central circumferential grooves disposed between the central row and the intermediate rows of blocks while nonetheless maintaining the width of the lateral circumferential grooves within the range of a predetermined value that would still be useful in protecting against the penetration by stones.

It was realized that the accomplishment of this task could depend on achieving a particular ratio between the widths of the circumferential, lateral and central grooves.

It was then felt that although the reduction in the width of the blocks of the intermediate rows, necessary to permit both widening of the central grooves and a predetermined width of the lateral grooves, would introduce a consequent poorer rigidity of the intermediate blocks, this effect could be compensated for by increasing the rigidity of the blocks of the central rows and by providing an elastic linkage between the blocks of the shoulder and intermediate rows.

The idea, in fact, was to liken the central, intermediate and shoulder rows of blocks to three parallel springs under load so that by giving the blocks of the central rows a more rigid shape than that of the other blocks it was possible to create in the central spring a greater elastic reaction which would protect the other rows of blocks.

It was also felt that it should be possible to reinforce the resistance to bending deformations of the intermediate and shoulder rows by means of a mutual elastic linkage so that these rows in combination could present an increased resistance to bending deformations.

In order to achieve satisfactorily quiet running the characteristics of inclining all the longitudinal sides of the blocks to the equatorial plane, and the circumferential staggering of the blocks of one row relative to the next, have been maintained.

In an initial aspect the invention therefore relates to a vehicle wheel tyre comprising a carcass structure that includes a central crown portion and two sidewalls terminating in two beads for fixing the tyre to a wheel rim; a belt structure coaxially fixed to the carcass structure; and a tread extending coaxially around the belt structure, its thickness being defined between the outer surface intended to contact the ground and the inner surface in contact with the said belt structure, having a tread pattern which comprises four, that is two lateral and two central, continuous circumferential grooves and a plurality of transverse grooves that together define five circumferential rows of blocks, that is two axially external shoulder rows, two axially internal intermediate rows and a central row that basically straddles the equatorial plane of the tyre, each block being a polygon composed of two sides extending longitudinally in a circumferential direction and two transverse end sides, one at the front and one at the rear with reference to a direction of travel, characterized in that in the said tread pattern:

a) the longitudinal sides of the blocks of each row are inclined in the same direction with a predetermined angle "α" to the equatorial plane of the tyre, b) the blocks of one row are circumferentially staggered relative to the blocks of the next row, c) the ratio of the width, measured axially, of each central circumferential groove to the width, measured axially, between opposite longitudinal sides of the blocks of the central row is not less than 20%, d) the ratio of the width of the lateral circumferential groove to the width of the central circumferential groove is between 45% and 60%, e) there are means of stiffening the blocks of the central row consisting in the fact that each front and rear side of each block is formed by a first and a second straight segment separated by an intermediate third connecting segment, the said first and second segments being inclined to the equatorial plane, and the profile of the front side, rotated through 180°, being the same as that of the rear side, and f) there are circumferential elastic means of linkage between the blocks of the shoulder and intermediate rows.

Conveniently, for the purposes of improved noise reduction, the inclination of said third segment is the opposite of that of the first and second segments.

The elastic linkage means preferably consist in the presence of elastomeric material of predetermined height between the bottom line of the axially external lateral groove and the inner boundary surface of the tread, and in an axially outer lateral groove whose width, measured on the outer boundary surface of the tread, is at least 6.5 mm.

The tyre conveniently comprises elastic linkage means between the adjacent blocks of the central row to contain the bending deformations; these elastic linkage means consist in the fact that, between pairs of adjacent blocks along the relevant transverse groove, an elastomeric relief extends from the internal surface of the tread toward the outer surface up to a predetermined height, preferably equal to at least 15% of the thickness of the tread.

Also, in a preferred embodiment, the first and second segments of both front and rear sides of the central blocks are inclined in the same direction by a predetermined angle "βo" relative to a plane perpendicular to the equatorial plane of the tyre.

Preferably, the said angle "βo" is between 15° and 21°.

Still more preferably, in each central block the intermediate third segment between the two straight segments forms an angle "γ" of between 30° and 60° to a plane perpendicular to the equatorial plane.

The said constructions of the transverse end sides of the central blocks advantageously improve the characteristics of quiet running and grip.

In accordance with one particular embodiment the tyre of the invention comprises elastic linkage means between adjacent blocks of the shoulder rows.

These elastic linkage means preferably consist in the fact that, between pairs of adjacent blocks along the relevant transverse groove, an elastomeric relief extends from the internal surface of the tread toward the outer surface up to a predetermined height.

The invention advantageously involves determining the height of this relief according as greater or less stiffness is required.

This relief can therefore vary between 9% and 60% of the thickness of the tread.

The tyre with the pattern according to the invention may comprise stone expulsion means, preferably comprising a narrowing of the grooves on only one of the defining sides of the grooves.

In another preferred embodiment the tyre comprises in a predetermined pitch of its pattern five transverse grooves, the distance between the centre lines of any two of the five transverse grooves being approximately ⅕ of the pitch.

BRIEF DESCRIPTION OF THE DRAWINGS

However, the present invention will now be explained more clearly with the aid of the following description and of the accompanying figures, which are provided purely by way of example without any limitation being intended. In the figures:

FIG. 4 is a right cross section through the abovementioned pattern taken on the plane marked IV—IV in FIG. 3;

FIG. 5 is a right cross section through the abovementioned pattern taken on the plane marked V—V in FIG. 3;

FIG. 6a is a different right cross section through the abovementioned pattern taken on the planes marked VI—VI identified by letters A, B, C, D, E, F in FIG. 2;

FIG. 6b illustrates a variant of the pattern shown in FIG. 6a;

FIG. 7 is a right cross section through the abovementioned pattern taken on the plane marked VII—VII in FIG. 2;

FIG. 8 is a different right cross section through the abovementioned pattern taken on the plane marked VIII—VIII in FIG. 3;

FIG. 9 is a right cross section through the abovementioned pattern taken on the plane marked IX—IX in FIG. 3;

FIG. 10 illustrates the shape of a block belonging to the central row;

FIG. 11 illustrates a block from the central row superimposed on a block from the intermediate row;

FIG. 12 illustrates a block from the intermediate row superimposed on a block from the shoulder row.

DETAILED DESCRIPTION OF THE PREFERRED EMBODIMENTS

Figure 1:
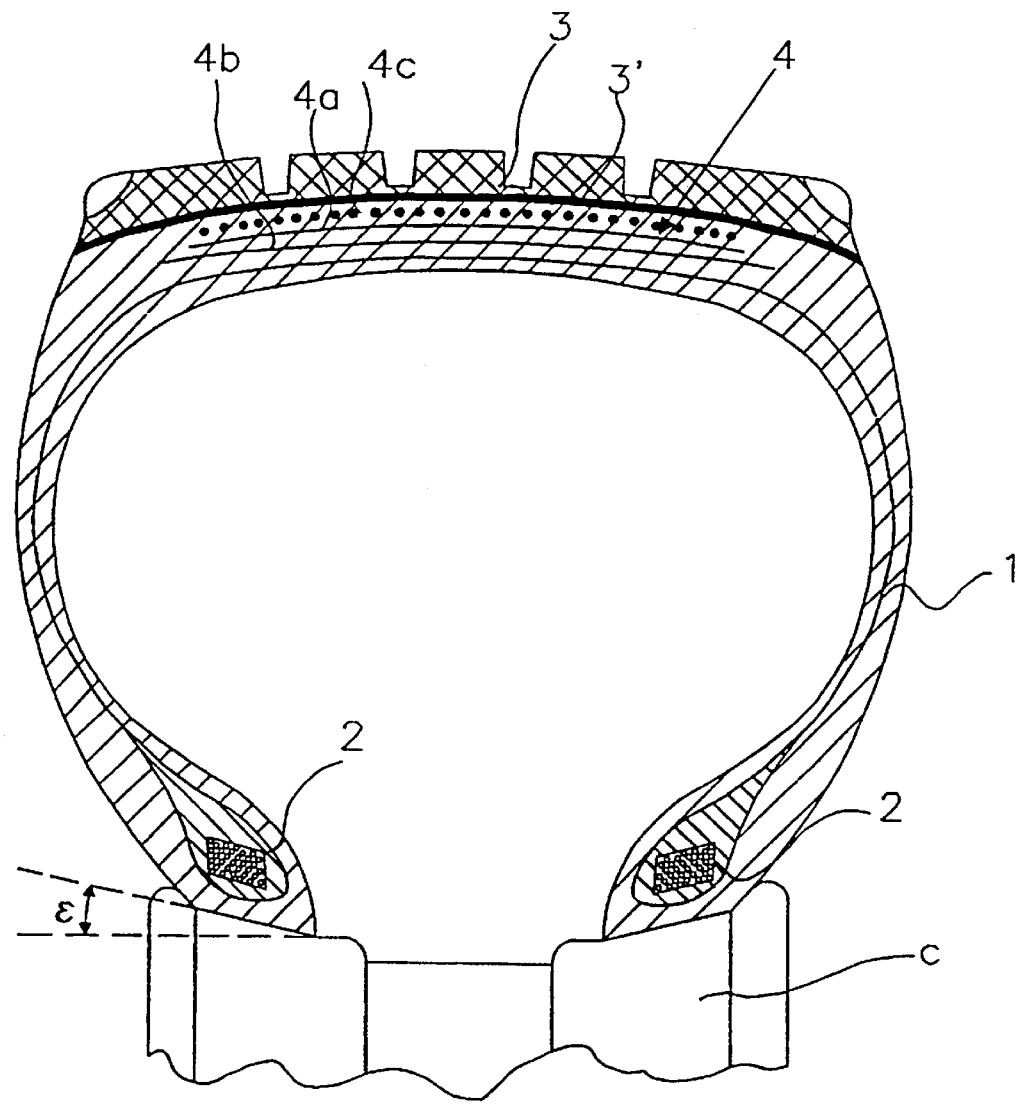
FIG. 1 illustrates in a right cross section the general structure of a tyre according to the invention.

FIG. 1 illustrates a vehicle tyre according to the invention, in particular a tyre, suitable for mid-length journeys, fitted to the drive wheel of a road train or truck.

The tyre comprises a carcass 1, shaped into a toric ring preferably consisting of a single reinforcing ply strengthened with metal cords lying in radial planes, that is planes containing the axis of rotation of the tyre. The edges of the ply are folded axially, from the inside towards the outside, around two annular metal cores 2, usually known as bead wires, constituting the reinforcement of the beads, i.e. of the radially innermost edges of the said tyre, their function being to enable the tyre to be fitted to its corresponding rim: this tyre is mounted on a rim C of the channel type in which the surfaces supporting the beads of the tyre taper outwards at an angle ω of approximately 15°.

On the crown of the said carcass there is laid a thick tread 3 of elastomeric material, in which is produced a road-contact pattern in relief designed to ensure among other things that the tyre has qualities of grip, quiet running, draining capacity and evenness of wear.

The tread has a predetermined thickness and is defined between the outer surface intended to contact the ground and the surface tangential to the cords of the radially outermost belt layer, of which more later. This thickness usually includes a sheet of elastomeric material drawn for simplicity's sake in FIG. 1 as a solid line 3'. The material of this sheet, applied hot to the tread, is different from the tread material, being expressly designed to produce adhesion at ambient temperature between the elastomeric material of the tread and the tyre components lying radially beneath it.

The thickness of the sheet is normally between 0.3 and 1 mm, compared with a total thickness of the tread of the order of 20–25 mm.

Situated between the carcass and the tread is an annular reinforcing structure 4, usually known as the belt, which is circumferentially inextensible and comprises at least two radially superimposed layers (4a, 4b) of rubberized fabric provided with metal reinforcing cords. These cords are arranged parallel with each other within each layer but cross at angles relative to the cords of the adjacent layer, preferably in a symmetrical arrangement relative to the equatorial plane of the tyre. There is preferably also a third layer 4c of metal cords of high-elongation type wound circumferentially, in a radially outer position, at least around the edges of the abovementioned underlying layers: as is well known, this structure has the specific purpose of counteracting the forces acting in the tyre during use, related to inflation pressure and centrifugal force, as well as of ensuring the necessary steering behaviour properties, specifically during cornering.

The tread comprises (FIG. 2) four continuous circumferential grooves, two of which are central 5 and two lateral 6, and a plurality of transverse grooves that together define five circumferential rows of blocks, that is two axially external lateral shoulder rows, two axially internal intermediate rows and a central row.

Going into more detail, the pattern consists of two pairs of lateral rows of blocks, namely blocks 7 in the intermediate rows and blocks 8 in the shoulder rows and a central row of blocks 9 passing around the equatorial plane X—X; the two lateral rows of each pair are situated on either side of the equatorial plane X—X.

The blocks of the intermediate and shoulder rows are defined by transverse grooves 10 and 11 respectively and the blocks of the central row by transverse grooves 12.

Each block in all the various possible embodiments comprises four sides and corresponding vertices a, b, c, d.

More specifically, each block is defined by two longitudinal sides oriented substantially circumferentially and two transverse end sides, one at the front and one at the rear with reference to a direction of travel. For convenience in FIG. 2 the vertices to the left of the equatorial plane have been identified at the junctions between the extensions of two sides, although the preferred embodiment comprises curvilinear connecting segments between sides leading to a vertex, as depicted to the right of the equatorial plane.

Figure 2:
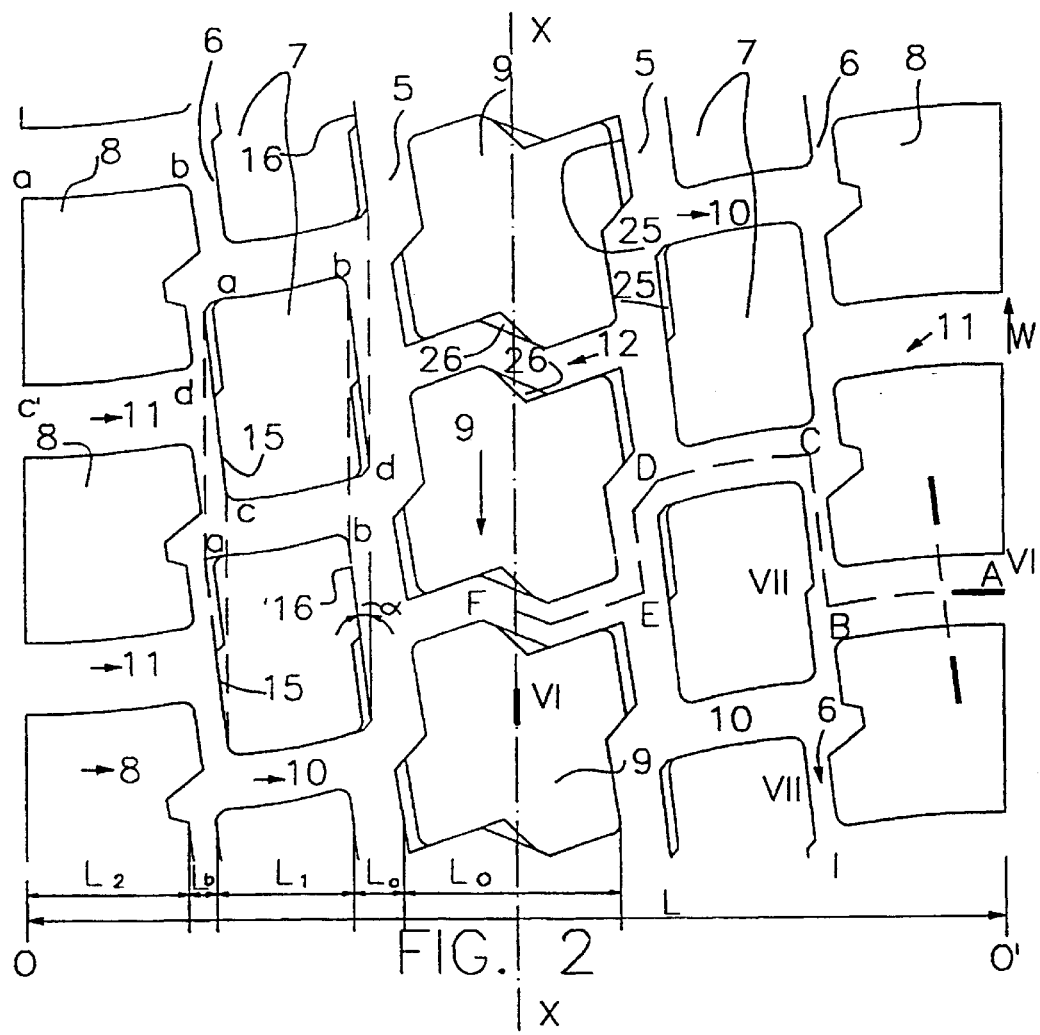
FIG. 2 is a plan view of the tread pattern according to the invention in one embodiment.

The blocks can assume many different polygonal configurations provided that, having defined a direction of travel of the tyre, for example the direction of the arrow "W" in FIG. 2, it is possible to define relative to this direction, for each block, a pair of front vertices a, b and a pair of rear vertices c, d.

Figure 3:
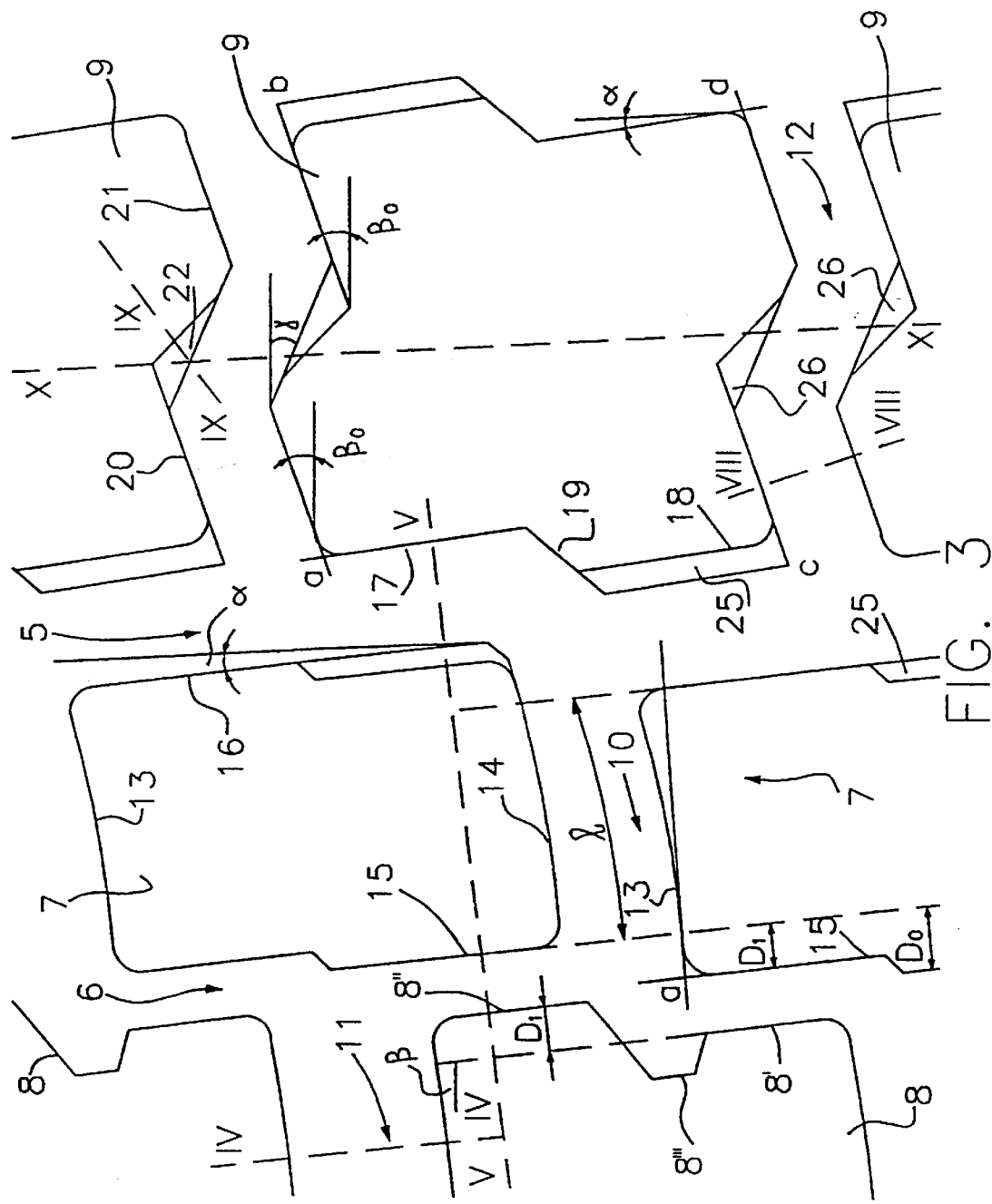
FIG. 3 shows a partial enlargement of FIG. 2.

Although the invention is suitable for many different shapes of blocks, it has been found convenient, for the purposes of satisfactory moulding of the tread pattern, to adopt blocks of essentially rectangular, quadrilateral or indeed rhomboidal polygonal shape, or optionally with certain modifications to certain parts, for the blocks of the intermediate and shoulder rows, as an examination of FIGS. 2 and 3 clearly shows.

In addition, in the embodiment shown in FIG. 3, each block 7 of the intermediate rows has its front side 13 between vertices a and b axially staggered by a predetermined amount "Do" relative to the rear side 14 between vertices c and d of the neighbouring block preceding it in the same row.

In FIG. 2, to the left of the equatorial plane, the front portions of the sides 15 have been drawn in dashes because, as will become clearer later, the block in the preferred embodiment is defined by the upper portion of this side drawn with a solid line.

Additionally, sides 15 and 16 of the blocks extending between a front vertex a, b and a rear vertex c, d are parallel to each other and inclined at a predetermined angle "α" to the equatorial plane marked X—X.

In essence the construction of the blocks 7 and their arrangement in the intermediate lateral rows is such that the front and rear sides of neighbouring blocks defining the transverse grooves 10 are directly opposite each other (FIG. 3) only along a segment "1" of their length.

Also, in a preferred embodiment, all the vertices of the blocks 7 of the intermediate rows, which are arranged identically for each block, are aligned along lines parallel to the equatorial plane.

The blocks 8 of the shoulder rows preferably have vertices aligned on two lines parallel to the equatorial plane, one of which lines is aligned with the edge of the pattern, and the shape of these blocks is still more preferably combined with the preferred characteristics of shape and arrangement of the adjacent blocks 7 of the intermediate rows so as to form lateral circumferential grooves 6 of constant breadth.

The embodiment of the blocks 7 of the intermediate rows is that defined by the sides drawn in solid lines in FIGS. 2 and 3. As these figures show, the offset between the sides 15 of two consecutive blocks of the row 7, measured perpendicularly to these sides, is equal to "D1".

As is visible in FIG. 3, the portions of the blocks 8 of the shoulder rows alongside the blocks 7 of the intermediate rows comprise two straight segments 8' and 8", parallel and inclined to the equatorial plane by the predetermined angle "α", and an intermediate connecting segment 8'".

In this configuration one of the two straight segments 8', 8" is staggered relative to the other by the quantity "D1" equal to the offset between upper and lower base sides of two blocks 7 arranged one after the other in the intermediate row.

Since, as can be seen in FIG. 3, one of the sides of the block 8 of the shoulder row is separated from the adjacent block 7 of the intermediate row by the same quantity "D1" by which the preceding block is set back in the same row, the result is a lateral groove 6 of constant breadth between the adjacent blocks.

Advantageously the formation of circumferential lateral grooves 5 and 6 of constant breadth avoids the presence of narrowings of section in the circumferential direction, which is good for water drainage in the contact patch, thus improving grip in the wet.

Preferably, as can be seen in FIG. 3, the intermediate segment 8'" between the two straight segments forms in each block a recess which continues the transverse groove 10.

Advantageously the formation of the said recess into the blocks of the shoulder row increases the tractive capacity of the tyre at the very portions of the tread best suited to providing this characteristic.

Another characteristic of this tread is that the sides of the blocks of one row are circumferentially offset relative to the blocks of the adjacent row in such a way that each block 8 of the shoulder row is next to at least two blocks 7 of the intermediate row. The circumferential lengths of the offset may be derived from blocks lying side by side for approximately ⅓ of the length of the adjacent block or even lying alongside each other for lengths greater than the previous length.

In the version shown in FIG. 2, the blocks 9 of the central row are staggered circumferentially relative to the blocks 7 of the intermediate rows and each central block lies alongside two blocks of these intermediate rows. Furthermore, those sides of the blocks of the central row that connect an upper vertex with a lower vertex are parallel to each other and inclined by the predetermined angle "α" to the equatorial plane.

Advantageously, the various characteristics, namely the inclination of the sides of the blocks by an angle "α" to the equatorial plane, the offset between the two base sides in the blocks of the inner lateral rows, and the circumferential stagger, produce, in combination with each other, better performance in terms of grip in both dry and wet conditions, together with low noise.

Still another characteristic form of the invention is represented by the fact that the pattern includes elastic means of linkage between the blocks 7 of the intermediate rows and the blocks 8 of the shoulder rows.

These linkage means consist (FIGS. 5, 6) in the presence of elastomeric material of predetermined height "h" between the bottom line of the circumferential grooves 6 and the inner boundary surface 3' of the tread. The circumferential grooves 6 each have a width measured on the outer boundary surface of the tread of between 6.5 and 8.5 mm.

This predetermined height "h" is at least 1 mm and may be up to 5 mm. The value "h" is preferably between 4% and 24% of the thickness of the tread.

This characteristic is advantageous for the purposes of even wear, because, beneath the contact patch, the blocks 7 of the intermediate rows, which are subject to forces directed basically in the rolling direction, are protected against substantial bending deformations by the presence of the elastomeric layer joining these blocks to those of the shoulder 8.

In practice, with the abovementioned stresses the blocks 7 and 8 of the intermediate and shoulder rows, joined by a layer of rubber and separated by a longitudinal groove of reduced width, offer, in combination, greater resistance to the deformations than would be the case if the layer of height "h" were missing.

Also, because of the resistance to bending deformations the row of shoulder blocks experiences even wear.

The geometrical shape of the blocks 9 of the central row constitutes another characteristic of the invention.

Returning to FIG. 2, it can readily be seen that the vertices of the blocks of the central row 9 are so arranged as to give rise to a block of chunky shape which is very effective at resisting tearing and laceration. The shape of the blocks of the central row is combined with the characteristics of shape and position of the neighbouring blocks 7 of the intermediate rows to produce circumferential grooves 5 of constant breadth.

This configuration is achieved by the fact that each block 9 in the central row is formed, in the portions facing the blocks of the adjacent rows, by two straight parallel segments 17, 18 inclined to the equatorial plane by the angle "α" and by an intermediate connecting segment 19 inclined to the equatorial plane in the opposite direction to "α" by an angle of different amplitude.

It should be observed that the two intermediate segments 19 produce an offset of the two segments 17 with respect to the segments 18 by a distance such as to create lateral grooves 5 of constant breadth between adjacent blocks.

Each block 9 comprises front and rear sides formed in a particular way. Thus, as is clearly shown in FIG. 3, each front side of these blocks 9 comprises two parallel straight segments, namely a first segment 20 and a second segment 21, separated by an intermediate, preferably straight segment 22; the first and second segments 20, 21 are inclined by a predetermined angle to a plane perpendicular to the equatorial plane, preferably both at an identical angle "βo" of inclination. The straight intermediate segment 22 is inclined in the opposite direction to segments 20 and 21 relative to the equatorial plane and forms an angle "γ" in the opposite direction.

The profile of the front side is the same as the profile of the rear side after rotation through 180°. Preferably too, all front and rear sides of the blocks 7 of the intermediate rows and of the blocks 8 of the shoulder rows are inclined by a predetermined angle to the equatorial plane and the amplitudes of the angles in one row may differ from those of the adjacent row.

These angles are preferably equal to each other and have an amplitude "γ" (FIG. 3) which may or may not be equal to "βo".

Advantageously, the said characteristic of inclination of the base sides of the blocks makes it possible to present in the contact patch a leading edge of the blocks with gradual extension as the tyre continues to roll.

In practice, compared with patterns in which the blocks touch the ground simultaneously across their full dimension, with the preferred solution shown in FIG. 2 the ground is contacted in successive fractions across the front sides, which gives an advantageous attenuation of the level of noise produced by the impact on the ground of the leading edges of the tread pattern.

Important characteristics of the tread according to the invention are the widths of the central circumferential grooves 5 and of the lateral grooves 6 and also their mutual ratios and the link with the width of the blocks 9 of the central row.

These dimensions relate to a tread of axial width "L" (FIG. 2) defined by the shoulder edges O–O'.

The widths considered for the circumferential grooves refer to the tread zone comprising longitudinal sides of the blocks of adjacent rows forming the walls of the circumferential grooves.

In more detail, the ratio of the width "La" of each central circumferential groove 5 to the width "Lo" of the blocks of the central row, both measured axially, is not less than 0.20.

Moreover the ratio of the width "Lb" of the circumferential lateral groove 6 to the width "La" of the central circumferential groove 5 is between 50% and 60%.

The constructional characteristic defined by the two ratios indicated above advantageously enables large stones to be trapped in the central grooves 5 and smaller stones in the circumferential grooves 6, before expelling them as the tyre continues to rotate.

In accordance with certain preferred illustrative embodiments, the ratios cited provide significant advantages compared with treads having blocks 9 in the central rows with axial width "Lo" not less than 18% of the axial width "L" of the tread.

The invention includes other preferred embodiments, and more specifically preferred predetermined amplitudes for the angle of inclination "α" of the sides of the blocks to the equatorial plane and preferred and predetermined values for the offset "D1" between the upper and lower sides of successive blocks in the intermediate rows.

Thus, it has been found beneficial to limit the amplitudes of the angle "α" to between 5° and 10°.

As far as the values of "D1" are concerned, values for which the adjacent "1" segments of the sides of successive blocks defining the transverse channels 10 are between 70% and 90% of the total length of the sides measured between opposite vertices, have been found beneficial.

It has been found beneficial, for the purposes of quieter running of the tyre, to restrict the amplitudes of the angle "β" (FIG. 3) to between 7° and 15°, those of the angle "βo" to between 15° and 22°, and those relating to the angle "γ" to between 30° and 60°.

The tyre of the invention includes other alternative embodiments that are helpful in achieving good grip.

In accordance with a first embodiment the good grip characteristics in a tread with a total thickness "Δ" of between 21 and 23 mm are related to the fact that the depth of the grooves 11 between blocks of the axially external shoulder row, as measured in a plane perpendicular to their centre line (FIG. 4), is equal to at least 90% of the thickness of the tread and the angle "η" between the walls of the groove is not less than 22°; in a specific example of an embodiment this angle is 26°. The width of the groove 11 is between 14 and 19 mm.

It was also considered useful, for the purposes of both further increasing grip and easy removal of water, to design the transverse grooves 11 with a gradual divergence outwards away from the tyre.

The opposite sides of the blocks that define the transverse grooves are preferably slightly curvilinear so as to approximate to the rectilinear.

Advantageously, both the large depth and the overall dimensions of the grooves 11 permit good ventilation of the tread in the shoulder zones, i.e. at the edges of the underlying belts whose mobility can generate heat in the thickness of the rubber in which they are embedded.

The tread with deep grooves 11 is therefore particularly indicated for countries with a hot climate.

In a second embodiment the shoulder rows include elastic linkage means between adjacent blocks 8.

These elastic linkage means consist in the fact that between pairs of adjacent blocks along the relevant transverse groove there extends an elastomeric relief from the inner boundary surface of the tread towards the outer surface up to a predetermined height "h1" (FIG. 6b) that is preferably between 9% and 60% of the thickness of the tread.

In one example of an embodiment in which the thickness "Δ" of the tread is 23 mm, there is a relief that increases gradually from the extremities of the groove until it reaches a maximum height "h1" of 12 mm with a breadth at the maximum height varying between 23 and 28 mm.

The elastic linkage means between adjacent blocks of the shoulder rows advantageously have the effect of stiffening this row and increasing its capacity to resist stresses.

Consequently a tyre with stiffened shoulder rows can be adopted in more stringent conditions of use than a tyre with grooves 11 having depths greater than at least 90% of the thickness of the tread.

To further accentuate the characteristics of grip it is preferable to adopt transverse grooves 10 (FIG. 7) having depths and angles η' between the walls analogous to those cited earlier for the grooves 11 of large depth.

In an example of an embodiment, the transverse groove 10 has widths of between 13 and 16 mm and angles between the defining walls of not less than 22°.

In another construction the tread pattern preferably has linkage means between blocks lying in series relative to each other in the same central row 9.

In one particular embodiment these linkage means, whose purpose is to resist bending deformations, consist (FIGS. 6a, 8) in the presence of elastomeric material between adjacent blocks of the central row.

The presence of elastomeric material is provided by an elastomeric relief extending up to a predetermined height "ho" from the inner boundary surface 3' of the tread. In the example described, this height "ho" is at least 4 mm and the groove 12 immediately above it is characterized by the fact that, in a section perpendicular to the centre line (FIG. 8), the angle "ε" between the walls of the groove is greater than 20°, and still more preferably greater than 22°.

In some examples the width of the groove 12 is between 10 and 12 mm and the depth is 18 mm.

In accordance with other advantageous embodiments of the invention, the tread 3 may include stone expulsion means situated between adjacent blocks defining the grooves.

In particular, these stone expulsion means comprise an angle greater than 25° between the walls of the grooves, and a narrowing of the section in the vicinity of the bottom.

This narrowing of the section is preferably formed on only one of the two blocks defining the groove.

Although the stone expulsion means can be formed along all the grooves, it has been found that, in a preferred embodiment, these means can be situated principally along the central circumferential grooves 5 and in another embodiment also along the transverse grooves 12.

As regards the expulsion means along the circumferential grooves 5, these consist in the fact that the aperture of the groove has an angle "δ" of not less than 24°, in one example equal to 27°, and a depth equal to at least 90% and preferably to at least 95% of the total thickness of the tread (FIG. 5, 6).

In addition, and in accordance with this same embodiment, the stone expulsion means comprise a narrowing of the section 25 alternately (FIG. 2) on a portion of one side of the block 7 of the intermediate row and then on one of the two lateral segments of the block 9 of the central row.

The narrowing of the section may be formed at a distance of between 3 and 6 mm from the inner surface of the tread and may have a width of between 2 and 4 mm.

This embodiment advantageously enables any encapsulated stones to be expelled by the effect of the speed of rotation of the tyre thanks to the specific depth and angle of the groove; owing to the narrowing of the section in the vicinity of the bottom of the groove. Stones cannot penetrate further and damage the belt layers.

Also advantageously, the provision of a narrowing of the section of the groove on only one side of the two adjacent blocks, in combination with the feature of multiple alternations of section narrowings first on one side of one block and then on the side of another block, makes it possible to avoid significant removal of elastomeric material while maintaining at optimum levels the ratio between the raised parts and the total volume of the tread. This promotes a high mileage.

In essence the advantage achieved is that of protecting the belt structure of the tyre from possible damage by the presence of stones on the road without prejudicing the tyre's grip by excessive removal of compound from the blocks.

Turning now to the stone expulsion means along the transverse grooves 12 of the central row, these means consist (FIG. 9) in the formation of a groove comprising an angle of aperture "k" of not less than 19°, in some examples between 20° and 22°, and a depth that is generally not less than at least 75% of the thickness of the tread, and of a narrowing 26 of the section, preferably around 9 mm deep.

In this version there are two section narrowings, one on each side of the two adjacent central blocks.

The two section narrowings advantageously assume a triangular form in order to provide the construction of FIG. 3 with a groove of constant breadth suitable for uniform grip behaviour and a high capacity to drain water towards the circumferential channels.

The tyre according to the invention provides many different advantages in addition to those indicated above.

Referring in the first place to FIG. 10, it will readily be seen that the formation of the block 9 of the central row can be derived from the process of subtracting, from the area of a parallelogram with two longitudinal sides, two transverse end sides and two diagonals S1, S2, two pairs of scalene trapezia, that is a first pair Q at the ends of diagonal S1, and a second pair R at the ends of diagonal S2.

FIG. 10 also clearly shows that the length of the block 9 measured in the direction of travel W parallel to the equatorial plane reduces from the value T to the value To, the ratio To/T being between 0.70 and 0.85.

The construction of the block 9 in relation to the polygonal shape from which it is derived offers the twin advantages of having a chunkier shape and of exhibiting a notable diminution of the toe effect.

The block 9 therefore assists in making the tread stiffer and less subject to uneven wear.

Even more specifically, the shape of the blocks 9 according to the invention is found to be beneficial when it is wished to use inclinations of the transverse end sides with angles "βo" of between 15° and 21° to the equatorial plane to obtain noise reduction.

Thus, it has been found that such angles would not be acceptable with parallelogram-shaped blocks, unlike those of the invention, as they would generate a large toe effect with consequent uneven wear.

A further advantage arises from the presence in the central blocks 9 of an intermediate connecting segment, between the straight segments inclined at an angle "γ" to the equatorial plane. This is because the feature of an intermediate segment inclined at angles of between 30° and 60° in combination with the amplitudes of the angles "β" and "α" offers a marked discontinuity of the leading edges of the block 9 with favourable results in terms of quiet running.

In practice it should be observed that the central block produced in the shape illustrated in FIG. 10 generates less noise than treads using blocks in which the angle "γ" approaches 0° or 90° and the angles "β" and "α" are zero. What happens is that in these possible cases the block would present a leading edge of poor variability and so tend to generate higher levels of noise.

Also to be pointed out is the achievement of good results in accordance with the more general aspect of the invention owing to the shape of the blocks, in particular the shape of the central block: as can be seen by the superimposition shown in FIG. 11, the intermediate block 7 has an axial width and an area that are significantly less than those of the block 9 of the central row.

FIG. 12 clearly shows the area of the intermediate block 7 to be largely contained within the area of the shoulder block.

By comparing FIGS. 11 and 12 it can be seen that the areas of the central blocks are greater than those of the shoulder blocks.

The tread according to the invention therefore has blocks 9 in the central row and blocks 7 and 8 in the intermediate and shoulder rows whose areas differ from each other in such a way that the blocks 9 of greater area than the others tend to absorb greater loads, thereby protecting the blocks 7 of the intermediate rows whose structure is weaker.

It should also be observed that the preferred embodiment comprising elastic linkage means both between the blocks 9 of the central row and between the blocks 8 of the shoulder rows further stiffens these rows, thus protecting the blocks 7 of the intermediate rows against tearing and lacerations.

As a consequence the formation of wide central circumferential grooves 5 and lateral grooves 6 whose width is between 50% and 60% of the central grooves, while reducing the width and area of the intermediate blocks 7, does not prejudice the properties of grip and even wear of the tread according to the invention.

It has also been found convenient to adopt the following values for the axial width and area between the blocks:

ratio L1/Lo of the width of the intermediate block to the width of the central block of between 60% and 80%; in the example shown in FIG. 11 this ratio is equal to 65%, ratio L1/L2 of the width of the intermediate block to the width of the shoulder block of between 80% and 95%, ratio between the areas of the intermediate and central blocks of between 60% and 75%, and ratio between the areas of the intermediate and shoulder blocks of between 80% and 90%.

Advantageously too, the tread according to the invention offers characteristics of very quiet running dependent not only on the shape of the blocks 9 of the central rows but also on the geometrical characteristics of the pattern as a whole.

Figure 13:
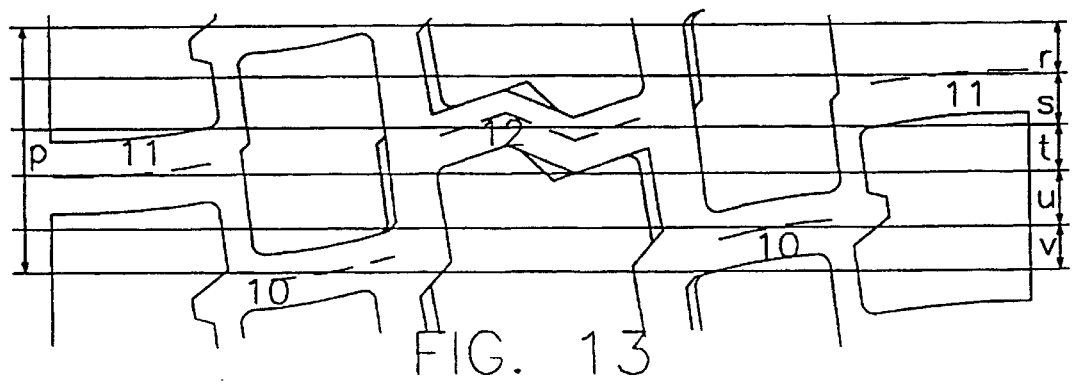
FIG. 13 illustrates in a partial view from FIG. 2 the distribution of transverse grooves in one pitch of the pattern.

To demonstrate this result reference should now be made to the tread pattern indicated in FIG. 13, focusing attention on that portion thereof relating to a predetermined pitch of value "p".

It will be observed that the characteristics of the invention are such that it is possible to produce a desired distance between the central points of the centre lines of the five transverse grooves indicated individually as r, s, t, u and v.

It will be noticed that the distance between two transverse grooves is generally around about ⅕ of "p".

In practice it has been constructed so that from the top of the pattern and proceeding downwards the entire pitch is divided into five parts, all substantially defined between two lines perpendicular to the equatorial plane and separated from each other by a distance equal to approximately ⅕ of the pitch.

Now assume that lines r, s, t, u and v correspond to successive leading edges of the tyre in the contact patch.

Notice, along each of these lines, the absence of the leading edge of one of the blocks present in a preceding line, together the fact that in the space "p", all five blocks belonging to the five rows of the pattern have been excluded separately from the leading edge.

The leading edge of the blocks along the contact patch therefore varies along the five lines and since the distribution of the leading edges along the pitch is uniform the result is uniform grip over the entire contact patch and an attenuation of the noise level owing to the different succession with which the various leading edges occur over the course of the pitch "p".

Another aspect tending to improve grip may also be highlighted: referring for example to the transverse grooves 10 between the blocks 7 of the intermediate rows, it can be seen that there is an offset in the axial direction between the lower and upper sides of the blocks situated in succession in any one row.

In practice the transverse grooves of this row are defined only by a segment "1" (FIG. 3) of the total length of these transverse sides of the blocks and this has the consequent advantage that it is impossible for material such as loose or snowy material to accumulate in the offset between the transverse sides of successive blocks.

A further advantage of the invention is due to the fact that all the blocks of the pattern in their many different possible configurations avoid the use of edges or more generally of intersections of sides forming acute angles, these being shapes to which uneven wear of the elastomeric material can be attributed. As FIG. 3 shows, the sides of the various blocks form angles at the junctions of approximately between 80° and 110°.

Also advantageously, the pattern according to the invention proves to be suitable for use in a tyre both in the direction of travel indicated by the arrow "W" and in the opposite direction, for, as can be seen in FIGS. 2 and 3, the blocks of the lateral rows to the left of the equatorial plane rotated through 180° about their geometrical centre are the same as the shape of the blocks of the corresponding rows to the right of the equatorial plane.

Analogously the left half of the central blocks, rotated through 180°, is the same as the right half.

The present description is intended purely for explanatory, nonrestrictive purposes so that the scope of the present invention will be understood to include also all those modifications and variations not expressly described but readily deducible by those skilled in the art from the present inventive concept.

What is claimed is:

1. A vehicle wheel tyre, comprising:
    a carcass structure including a central crown portion and two axially opposing sidewalls terminating in two beads for fixing the tyre to a wheel rim;
    a belt structure coaxially fixed to the carcass structure; and
    a tread extending coaxially around the belt structure and moulded to a relief pattern which comprises four, that is two lateral and two central, continuous circumferential grooves and a plurality of transverse grooves that together define at least five circumferential rows of blocks, that is two axially external shoulder rows, two axially internal intermediate rows, and a central row that substantially straddles an equatorial plane of the tyre, each block approximating a polygon comprising two longitudinal sides extending in a circumferential direction and two transverse sides, one at a front and one at a rear with reference to a direction of travel;
    wherein, in the tread pattern:
        the longitudinal sides of the blocks of each row, except the longitudinal sides farthest from the equatorial plane of the tyre of the blocks of the shoulder rows, are inclined in a same direction at a predetermined first angle to the equatorial plane of the tyre,
        the blocks of each row are circumferentially staggered relative to the blocks of a next row,
        a ratio of a width of each central circumferential groove to an axial distance between opposite longitudinal sides of the blocks of the central row is not less than 20%,
        a ratio of a width of each lateral circumferential groove to the width of the central circumferential groove is between 45% and 60%,
        each transverse side of each block of the central row is formed by first and second straight lateral segments separated by an intermediate third connecting segment, the first and second segments being inclined to the equatorial plane of the tyre, and a profile of the rear transverse side of the blocks of the central row being the same as a profile of the front transverse side of the blocks of the central row rotated through 180° about a first axis of rotation including a geometrical centre of a respective block of the central row and a point of intersection of the equatorial plane of the tyre with a second axis of rotation of the tyre, and elastic linkage means are provided between the blocks of the shoulder rows and the blocks of the intermediate rows.

2. The tyre of claim 1, wherein an inclination of the third segment to the equatorial plane of the tyre is opposite to the inclination of the first and second segments to the equatorial plane of the tyre.

3. The tyre of claim 1, wherein the elastic linkage means consists of elastomeric material of a predetermined first height between a bottom of the lateral grooves and an inner surface of the tread.

4. The tyre of claim 3, wherein the first height is at least 8% of a total thickness of the tread.

5. The tyre of claim 1, further comprising elastic linkage means between adjacent blocks of the central row to contain bending deformations.

6. The tyre of claim 1 wherein the elastic linkage means consists of an elastomeric relief extending from an inner surface of the tread toward an outer surface of the tread to a predetermined second height between pairs of circumferentially-adjacent blocks along a respective transverse groove.

7. The tyre of claim 6, wherein the second height is at least 15% of a thickness of the tread.

8. The tyre of claim 1, wherein the first angle is between 5° and 10°.

9. The tyre of claim 1, wherein a third angle formed by the third segment to a plane perpendicular to the equatorial plane of the tyre is between 30° and 60°.

10. The tyre of claim 1, wherein the front and rear transverse sides of the blocks of the intermediate rows form a fourth angle to a plane perpendicular to the equatorial plane of the tyre between 7° and 15°.

11. The tyre of claim 1, wherein each block of the central row is obtained by subtracting, from an area of a polygon of essentially parallelogram shape with two transverse end sides, two longitudinal sides, and two diagonals, areas of a first and second pair of shapes approximating scalene trapezoids, the first and second pair being at ends of the two diagonals.

12. The tyre of claim 1, wherein a ratio of a maximum width of each central block to a distance between outer edges of the blocks of the shoulder rows, both width and distance measured along a plane perpendicular to the equatorial plane of the tyre, is not less than 18%.

13. The tyre of claim 1, wherein a maximum width of the blocks of the central row is greater than a maximum width of the blocks of the intermediate rows, and wherein the maximum width of the blocks of the central row is greater than a maximum width of the blocks of the shoulder rows, all widths being measured along a plane perpendicular to the equatorial plane of the tyre.

14. The tyre of claim 1, wherein a ratio between a width of the blocks of the intermediate rows to a width of the blocks of the central row, measured axially in zones in which the longitudinal sides of the blocks of the intermediate rows and central row are adjacent, is between 65% and 75%.

15. The tyre of claim 1, wherein a ratio of an area of a block of the intermediate rows to an area of a block of the central row is between 60% and 75%.

16. The tyre of claim 1, further comprising elastic linkage means between circumferentially-adjacent blocks of the shoulder rows.

17. The tyre of claim 16, wherein the elastic linkage means consists of an elastomeric relief extending from an inner surface of the tread toward an outer surface of the tread to a predetermined second height between pairs of circumferentially-adjacent blocks along a respective transverse groove.

18. The tyre of claim 17, wherein the second height is between 9% and 60% of a thickness of the tread.

19. The tyre of claim 1, wherein a depth of transverse grooves between circumferentially-adjacent blocks of the shoulder rows is at least 90% of a thickness of the tread.

20. The tyre of claim 1, wherein transverse grooves between circumferentially-adjacent blocks of the intermediate rows have a depth approximately equal to a thickness of the tread.

21. The tyre of claim 1, wherein in a plane orthogonal to a centre line of transverse grooves between circumferentially-adjacent blocks of the intermediate rows, a fifth angle between walls of the transverse grooves is at least 22°.

22. The tyre of claim 1, wherein a width of transverse grooves between circumferentially-adjacent blocks of the intermediate rows is between 13 mm and 16 mm.

23. The tyre of claim 1, wherein the tread pattern repeats as a function of at least one predetermined pitch, and wherein a distance measured in a circumferential direction between a centre line of a transverse groove of a first circumferential row of blocks to a centre line of a transverse groove of a second circumferential row of blocks is approximately ⅓ of the pitch multiplied by a natural number.

24. The tyre of claim 1, further comprising stone expulsion means.

25. The tyre of claim 24, wherein the stone expulsion means comprises, in planes orthogonal to centre lines of the circumferential or transverse grooves, a predetermined sixth angle between walls of the grooves and a narrowing of the grooves near a bottom of the grooves.

26. The tyre of claim 25, wherein the sixth angle is at least 24°.

27. The tyre of claim 25, wherein the narrowing of the grooves is on one side only of the grooves.

28. The tyre of claim 24, wherein the stone expulsion means is situated along the central circumferential grooves.

29. The tyre of claim 28, wherein the stone expulsion means comprises a narrowing of a groove on one longitudinal side only or, alternatively, a narrowing on one longitudinal side of a block in an intermediate row and a narrowing on one longitudinal side of an adjacent block in the central row.

30. The tyre of claim 28, wherein the stone expulsion means comprises grooves whose depth is equal to at least 90% of a thickness of the tread.

31. The tyre of claim 24, wherein the stone expulsion means is situated in transverse grooves between the blocks of the central row.

32. The tyre of claim 31, wherein the stone expulsion means is situated along a transverse groove which is created by forming, on each portion of two adjacent blocks, two straight end segments connected by an intermediate segment inclined to the end segments in such a way as to form an obtuse angle in an approximately central position, the stone expulsion means consisting of a narrowing of a centre of the groove towards a bottom of the groove due to two opposing triangular portions.

33. The tyre of claim 1, wherein shapes of the blocks of the shoulder row on a first side of the equatorial plane of the tyre are the same as shapes of the blocks of the shoulder row on a second side of the equatorial plane of the tyre, rotated through 180° about a third axis of rotation including a geometrical centre of a respective block of the shoulder rows and a point on a second axis of rotation of the tyre, wherein the third axis of rotation is parallel to the equatorial plane of the tyre, and wherein shapes of the blocks of the intermediate row on the first side of the equatorial plane of the tyre are the same as shapes of the blocks of the intermediate row on the second side of the equatorial plane of the tyre, rotated through 180° about a fourth axis of rotation including a geometrical centre of a respective block of the intermediate rows and a point on a second axis of rotation of the tyre, wherein the fourth axis of rotation is parallel to the equatorial plane of the tyre.

34. A vehicle tyre tread, a thickness of which is defined between an outer surface intended to contact the ground and an inner surface in contact with an elastomeric sheet, comprising four, that is two lateral and two central, continuous circumferential grooves and a plurality of transverse grooves that define at least five circumferential rows of blocks, that is two axially external shoulder rows, two axially internal intermediate rows, and a central row that substantially straddles an equatorial plane of the tyre, each block approximating a polygon comprising two sides extending longitudinally in a circumferential direction and two transverse end sides, one at a front and one at a rear with reference to a direction of travel, wherein:

longitudinal sides of the blocks of each row are inclined in a same direction with a predetermined first angle to the equatorial plane of the tyre, blocks of one row are circumferentially staggered relative to the blocks of a next row, a ratio of a width, measured axially, of each central circumferential groove to a width, measured axially, between opposite longitudinal sides of the blocks of the central row is not less than 20%, a ratio of a width of the lateral circumferential grooves to a width of the central circumferential grooves is between 45% and 60%, each of the front and rear transverse sides of each block of the central row is formed by first and second straight segments separated by an intermediate third connecting segment, the first and second segments being inclined to the equatorial plane of the tyre, and a profile of the front transverse side rotated through 180° about a first axis of rotation including a geometrical centre of a respective block of the central row and a point of intersection of the equatorial plane of the tyre with a second axis of rotation of the tyre being the same as a profile of the rear transverse side, and elastic linkage means are provided between the blocks of the shoulder rows and the blocks of the intermediate rows.

35. A vehicle wheel tyre, comprising:
a carcass structure including a central crown portion and two axially opposing sidewalls terminating in two beads for fixing the tyre to a wheel rim;
a belt structure coaxially fixed to the carcass structure; and a tread extending coaxially around the belt structure and moulded to a relief pattern which comprises four, that is two lateral and two central, continuous circumferential grooves and a plurality of transverse grooves that together define at least five circumferential rows of blocks, that is two axially external shoulder rows, two axially internal intermediate rows, and a central row that substantially straddles an equatorial plane of the tyre, each block approximating a polygon comprising two longitudinal sides extending in a circumferential direction and two transverse sides, one at a front and one at a rear with reference to a direction of travel;

wherein, in the tread pattern:
the longitudinal sides of the blocks of each row, except the longitudinal sides farthest from the equatorial plane of the tyre of the blocks of the shoulder rows, are inclined in a same direction at a predetermined first angle to the equatorial plane of the tyre, the blocks of each row are circumferentially staggered relative to the blocks of a next row, a ratio of a width of each central circumferential groove to an axial distance between opposite longitudinal sides of the blocks of the central row is not less than 20%, a ratio of a width of each lateral circumferential groove to the width of the central circumferential groove is between 45% and 60%, each transverse side of each block of the central row is formed by first and second straight lateral segments separated by an intermediate third connecting segment, the first and second segments being inclined to the equatorial plane of the tyre, and a profile of the rear transverse side of the blocks of the central row being the same as a profile of the front transverse side of the blocks of the central row rotated through 180° about a first axis of rotation including a geometrical centre of a respective block of the central row and a point of intersection of the equatorial plane of the tyre with a second axis of rotation of the tyre, wherein the first and second segments of both front and rear transverse sides of the blocks of the central row are inclined in a same direction by a predetermined second angle relative to a plane perpendicular to the equatorial plane of the tyre, and elastic linkage means are provided between the blocks of the shoulder rows and the blocks of the intermediate rows.

36. The tyre of claim 35, wherein an inclination of the third segment to the equatorial plane of the tyre is opposite to the inclination of the first and second segments to the equatorial plane of the tyre.

37. The tyre of claim 35, wherein the elastic linkage means consists of elastomeric material of a predetermined first height between a bottom of the lateral grooves and an inner surface of the tread.

38. The tyre of claim 37, wherein the first height is at least 8% of a total thickness of the tread.

39. The tyre of claim 35, further comprising elastic linkage means between adjacent blocks of the central row to contain bending deformations.

40. The tyre of claim 35, wherein the elastic linkage means consists of an elastomeric relief extending from an inner surface of the tread toward an outer surface of the tread to a predetermined second height between pairs of circumferentially-adjacent blocks along a respective transverse groove.

41. The tyre of claim 40, wherein the second height is at least 15% of a thickness of the tread.

42. The tyre of claim 35, wherein the first angle is between 5° and 10°.

43. The tyre of claim 35, wherein the second angle is between 15° and 21°.

44. The tyre of claim 35, wherein a third angle formed by the third segment to a plane perpendicular to the equatorial plane of the tyre is between 30° and 60°.

45. The tyre of claim 35, wherein the front and rear transverse sides of the blocks of the intermediate rows form a fourth angle to a plane perpendicular to the equatorial plane of the tyre between 7° and 15°.

46. The tyre of claim 35 wherein each block of the central row is obtained by subtracting, from an area of a polygon of essentially parallelogram shape with two transverse end sides, two longitudinal sides, and two diagonals, areas of a first and second pair of shapes approximating scalene trapezoids, the first and second pair being at ends of the two diagonals.

47. The tyre of claim 35, wherein a ratio of a maximum width of each central block to a distance between outer edges of the blocks of the shoulder rows, both width and distance measured along a plane perpendicular to the equatorial plane of the tyre, is not less than 18%.

48. The tyre of claim 35, wherein a maximum width of the blocks of the central row is greater than a maximum width of the blocks of the intermediate rows, and wherein the maximum width of the blocks of the central row is greater than a maximum width of the blocks of the shoulder rows, all widths being measured along a plane perpendicular to the equatorial plane of the tyre.

49. The tyre of claim 35, wherein a ratio between a width of the blocks of the intermediate rows to a width of the blocks of the central row, measured axially in zones in which the longitudinal sides of the blocks of the intermediate rows and central row are adjacent, is between 65% and 75%.

50. The tyre of claim 35, wherein a ratio of an area of a block of the intermediate rows to an area of a block of the central row is between 60% and 75%.

51. The tyre of claim 35, further comprising elastic linkage means between circumferentially-adjacent blocks of the shoulder rows.

52. The tyre of claim 51, wherein the elastic linkage means consists of an elastomeric relief extending from an inner surface of the tread toward an outer surface of the tread to a predetermined second height between pairs of circumferentially-adjacent blocks along a respective transverse groove.

53. The tyre of claim 52, wherein the second height is between 9% and 60% of a thickness of the tread.

54. The tyre of claim 35, wherein a depth of transverse grooves between circumferentially-adjacent blocks of the shoulder rows is at least 90% of a thickness of the tread.

55. The tyre of claim 35, wherein transverse grooves between circumferentially-adjacent blocks of the intermediate rows have a depth approximately equal to a thickness of the tread.

56. The tyre of claim 35, wherein in a plane orthogonal to a centre line of transverse grooves between circumferentially-adjacent blocks of the intermediate rows, a fifth angle between walls of the transverse grooves is at least 22°.

57. The tyre of claim 35, wherein a width of transverse grooves between circumferentially-adjacent blocks of the intermediate rows is between 13 mm and 16 mm.

58. The tyre of claim 35, wherein the tread pattern repeats as a function of at least one predetermined pitch, and wherein a distance measured in a circumferential direction between a centre line of a transverse groove of a first circumferential row of blocks to a centre line of a transverse groove of a second circumferential row of blocks is approximately ⅕ of the pitch multiplied by a natural number.

59. The tyre of claim 35, further comprising stone expulsion means.

60. The tyre of claim 59, wherein the stone expulsion means comprises, in planes orthogonal to centre lines of the circumferential or transverse grooves, a predetermined sixth angle between walls of the grooves and a narrowing of the grooves near a bottom of the grooves.

61. The tyre of claim 60, wherein the sixth angle is at least 24°.

62. The tyre of claim 60, wherein the narrowing of the grooves is on one side only of the grooves.

63. The tyre of claim 59, wherein the stone expulsion means is situated along the central circumferential grooves.

64. The tyre of claim 63, wherein the stone expulsion means comprises a narrowing of a groove on one longitudinal side only or, alternatively, a narrowing on one longitudinal side of a block in an intermediate row and a narrowing on one longitudinal side of an adjacent block in the central row.

65. The tyre of claim 63, wherein the stone expulsion means comprises grooves whose depth is equal to at least 90% of a thickness of the tread.

66. The tyre of claim 59, wherein the stone expulsion means is situated in transverse grooves between the blocks of the central row.

67. The tyre of claim 66, wherein the stone expulsion means is situated along a transverse groove which is created by forming, on each portion of two adjacent blocks, two straight end segments connected by an intermediate segment inclined to the end segments in such a way as to form an obtuse angle in an approximately central position, the stone expulsion means consisting of a narrowing of a centre of the groove towards a bottom of the groove due to two opposing triangular portions.

68. The tyre of claim 35, wherein shapes of the blocks of the shoulder row on a first side of the equatorial plane of the tyre are the same as shapes of the blocks of the shoulder row on a second side of the equatorial plane of the tyre, rotated through 180° about a third axis of rotation including a geometrical centre of a respective block of the shoulder rows and a point on a second axis of rotation of the tyre, wherein the third axis of rotation is parallel to the equatorial plane of the tyre, and wherein shapes of the blocks of the intermediate row on the first side of the equatorial plane of the tyre are the same as shapes of the blocks of the intermediate row on the second side of the equatorial plane of the tyre, rotated through 180° about a fourth axis of rotation including a geometrical centre of a respective block of the intermediate rows and a point on a second axis of rotation of the tyre, wherein the fourth axis of rotation is parallel to the equatorial plane of the tyre.

69. A vehicle tyre tread, a thickness of which is defined between an outer surface intended to contact the ground and an inner surface in contact with an elastomeric sheet, comprising four, that is two lateral and two central, continuous circumferential grooves and a plurality of transverse grooves that define at least five circumferential rows of blocks, that is two axially external shoulder rows, two axially internal intermediate rows, and a central row that substantially straddles an equatorial plane of the tyre, each block approximating a polygon comprising two sides extending longitudinally in a circumferential direction and two transverse end sides, one at a front and one at a rear with reference to a direction of travel, wherein:

longitudinal sides of the blocks of each row are inclined in a same direction with a predetermined first angle to the equatorial plane of the tyre, blocks of one row are circumferentially staggered relative to the blocks of a next a ratio of a width, measured axially, of each central circumferential groove to a width, measured axially, between opposite longitudinal sides of the blocks of the central row is not less than 20%, a ratio of a width of the lateral circumferential grooves to a width of the central circumferential grooves is between 45% and 60%, each of the front and rear transverse sides of each block of the central row is formed by first and second straight segments separated by an intermediate third connecting segment, the first and second segments being inclined to the equatorial plane of the tyre, and a profile of the front transverse side rotated through 180° about a first axis of rotation including a geometrical centre of a respective block of the central row and a point of intersection of the equatorial plane of the tyre with a second axis of rotation of the tyre being the same as a profile of the rear transverse side, wherein the first and second segments of both front and rear transverse sides of the blocks of the central row are inclined in a same direction by a predetermined second angle relative to a plane perpendicular to the equatorial plane of the tyre, and elastic linkage means are provided between the blocks of the shoulder rows and the blocks of the intermediate rows.

* * * * *

UNITED STATES PATENT AND TRADEMARK OFFICE
CERTIFICATE OF CORRECTION

PATENT NO. : 6,736,175 B2
DATED : May 18, 2004
INVENTOR(S) : Alberto Carra et al.

It is certified that error appears in the above-identified patent and that said Letters Patent is hereby corrected as shown below:

Column 15,
Line 27, "claim 1 wherein" should read -- claim 1, wherein --.

Column 19,
Line 14, "claim 35 wherein" should read -- claim 35, wherein --.

Column 21,
Line 8, after "next" insert -- row, --.

Signed and Sealed this

Twenty-eighth Day of September, 2004

JON W. DUDAS
*Director of the United States Patent and Trademark Office*